(12) United States Patent
Hunter et al.

(10) Patent No.: US 12,468,433 B2
(45) Date of Patent: Nov. 11, 2025

(54) TILE BASED MEDIA CONTENT SELECTION

(71) Applicant: Adeia Media Holdings LLC, San Jose, CA (US)

(72) Inventors: Kirsten Hunter, San Francisco, CA (US); Christopher Chan, San Francisco, CA (US); Vasanth Shenoy, Fremont, CA (US); James Collette, Sammamish, WA (US); Do H. Chung, San Ramon, CA (US); Allen Billings, Lafayette, CA (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

(21) Appl. No.: 18/200,501

(22) Filed: May 22, 2023

(65) Prior Publication Data

US 2024/0118788 A1    Apr. 11, 2024

Related U.S. Application Data

(63) Continuation of application No. 17/697,713, filed on Mar. 17, 2022, now Pat. No. 11,693,534, which is a
(Continued)

(51) Int. Cl.
*G06F 3/0482* (2013.01)
*G06F 3/04842* (2022.01)
(Continued)

(52) U.S. Cl.
CPC ........ *G06F 3/0482* (2013.01); *G06F 3/04842* (2013.01); *H04N 21/4312* (2013.01);
(Continued)

(58) Field of Classification Search
CPC ............ G06F 3/04842; H04N 21/4312; H04N 21/4622; H04N 21/47; H04N 21/47202;
(Continued)

(56) References Cited

U.S. PATENT DOCUMENTS

| 8,028,315 B1 | 9/2011 | Barber |
| 8,281,339 B1 | 10/2012 | Walker et al. |

(Continued)

FOREIGN PATENT DOCUMENTS

| DE | 112011101003 T5 | 2/2013 |
| GB | 2497624 A | 6/2013 |

OTHER PUBLICATIONS

U.S. Appl. No. 13/053,093, Advisory Action mailed Aug. 23, 2013, 3 pgs.
(Continued)

*Primary Examiner* — Nnenna N Ekpo
(74) *Attorney, Agent, or Firm* — HALEY GUILIANO LLP

(57) ABSTRACT

Mechanisms are provided for allowing a user to dynamically manage rich media content in an efficient and effective manner. Tiles including media content, personalized video selections, content pack upgrades, and promotions for featured content are presented to a user. Each tile may include calls to view, purchase, discuss, rate, review, or read about associated content. Tiles may be presented as still images, logos, text, or live video. Multiple tiles may be manipulated using keyboard, mouse, touchpad, and/or touchscreen movements, motions, and gestures. In particular examples, an overlay provided on top of a tile mechanism provides a user with additional navigation and management options.

17 Claims, 11 Drawing Sheets

Related U.S. Application Data continuation of application No. 16/382,014, filed on Apr. 11, 2019, now Pat. No. 11,307,736, which is a continuation of application No. 14/522,106, filed on Oct. 23, 2014, now Pat. No. 10,261,657, which is a continuation of application No. 13/053,093, filed on Mar. 21, 2011, now Pat. No. 8,887,202.

(60) Provisional application No. 61/316,156, filed on Mar. 22, 2010.

(51) Int. Cl.
*H04N 21/431* (2011.01)
*H04N 21/462* (2011.01)
*H04N 21/47* (2011.01)
*H04N 21/472* (2011.01)
*H04N 21/482* (2011.01)
*H04N 21/81* (2011.01)

(52) U.S. Cl.
CPC ......... *H04N 21/4622* (2013.01); *H04N 21/47* (2013.01); *H04N 21/47202* (2013.01); *H04N 21/47217* (2013.01); *H04N 21/4821* (2013.01); *H04N 21/812* (2013.01)

(58) Field of Classification Search
CPC ......... H04N 21/47217; H04N 21/4821; H04N 21/812
See application file for complete search history.

(56) References Cited

U.S. PATENT DOCUMENTS

| | | |
|---|---|---|
| 8,850,481 B2 | 9/2014 | Shannon et al. |
| 8,887,202 B2 | 11/2014 | Hunter et al. |
| 8,910,209 B2 | 12/2014 | Shanks |
| 10,021,460 B2* | 7/2018 | Yim .................. H04N 21/4312 |
| 10,261,657 B2 | 4/2019 | Hunter et al. |
| 11,307,736 B2 | 4/2022 | Hunter et al. |
| 11,693,534 B2 | 7/2023 | Hunter et al. |
| 2005/0235310 A1 | 10/2005 | Bies |
| 2006/0020973 A1 | 1/2006 | Hannum et al. |
| 2006/0161952 A1 | 7/2006 | Herz et al. |
| 2006/0173838 A1 | 8/2006 | Garg et al. |
| 2006/0206912 A1 | 9/2006 | Klarfeld et al. |
| 2007/0011702 A1 | 1/2007 | Vaysman |
| 2007/0136778 A1 | 6/2007 | Birger et al. |
| 2007/0260635 A1 | 11/2007 | Ramer et al. |
| 2007/0266403 A1 | 11/2007 | Ou et al. |
| 2008/0046928 A1 | 2/2008 | Poling et al. |
| 2008/0060005 A1 | 3/2008 | Shanks et al. |
| 2009/0030772 A1 | 1/2009 | Flake et al. |
| 2009/0089152 A1 | 4/2009 | Davis et al. |
| 2009/0100469 A1 | 4/2009 | Conradt et al. |
| 2009/0125934 A1 | 5/2009 | Jones et al. |
| 2009/0133059 A1* | 5/2009 | Gibbs .................. G06F 16/48 725/34 |
| 2009/0158337 A1 | 6/2009 | Stiers et al. |
| 2009/0199241 A1 | 8/2009 | Unger et al. |
| 2009/0271826 A1 | 10/2009 | Lee et al. |
| 2009/0292672 A1 | 11/2009 | Kunjithapatham et al. |
| 2009/0313550 A1 | 12/2009 | Kim et al. |
| 2010/0031162 A1 | 2/2010 | Wiser et al. |
| 2010/0063877 A1 | 3/2010 | Soroca et al. |
| 2010/0153999 A1* | 6/2010 | Yates .................. H04N 21/472 725/39 |
| 2011/0231878 A1 | 9/2011 | Hunter et al. |
| 2015/0046821 A1 | 2/2015 | Hunter et al. |
| 2017/0134818 A1 | 5/2017 | Bi et al. |
| 2019/0235708 A1 | 8/2019 | Hunter et al. |
| 2022/0382418 A1 | 12/2022 | Hunter et al. |

OTHER PUBLICATIONS

U.S. Appl. No. 13/053,093, Examiner Interview Summary mailed May 27, 2014, 3 pgs.
U.S. Appl. No. 13/053,093, Examiner Interview Summary mailed Oct. 18, 2013, 3 pgs.
U.S. Appl. No. 13/053,093, Final Office Action mailed Mar. 20, 2014, 13 pgs.
U.S. Appl. No. 13/053,093, Final Office Action mailed Jun. 10, 2013, 12 pgs.
U.S. Appl. No. 13/053,093, Non Final Office Action mailed Jan. 3, 2013, 13 pgs.
U.S. Appl. No. 13/053,093, Non Final Office Action mailed Oct. 3, 2013, 12 pgs.
U.S. Appl. No. 13/053,093, Notice of Allowance mailed Jul. 8, 2014, 10 pgs.
U.S. Appl. No. 13/053,093, Response filed Oct. 15, 2012 to Non Final Office Action mailed Sep. 14, 2012, 9 pgs.
U.S. Appl. No. 14/522,106, Advisory Action mailed Feb. 6, 2018, 3 pgs.
U.S. Appl. No. 14/522,106, Advisory Action mailed May 9, 2017, 4 pgs.
U.S. Appl. No. 14/522,106, Advisory Action mailed Oct. 12, 2018, 3 pgs.
U.S. Appl. No. 14/522,106, Examiner Interview Summary mailed Jan. 18, 2019, 1 pg.
U.S. Appl. No. 14/522,106, Examiner Interview Summary mailed Feb. 2, 2017, 3 pgs.
U.S. Appl. No. 14/522,106, Examiner Interview Summary mailed Feb. 6, 2018, 2 pgs.
U.S. Appl. No. 14/522,106, Examiner Interview Summary mailed May 9, 2017, 1 pg.
U.S. Appl. No. 14/522,106, Examiner Interview Summary mailed Oct. 12, 2018, 2pgs.
U.S. Appl. No. 14/522,106, Examiner Interview Summary mailed Oct. 30, 2017, 3 pgs.
U.S. Appl. No. 14/522,106, Examiner Interview Summary mailed Nov. 5, 2018, 3 pgs.
U.S. Appl. No. 14/522,106, Final Office Action mailed Feb. 14, 2017, 15 pgs.
U.S. Appl. No. 14/522,106, Non Final Office Action mailed Mar. 19, 2018, 12 pgs.
U.S. Appl. No. 14/522,106, Non Final Office Action mailed Jul. 14, 2017, 12 pgs.
U.S. Appl. No. 14/522,106, Non Final Office Action mailed Sep. 16, 2016, 12 pgs.
U.S. Appl. No. 14/522,106, Notice of Allowance mailed Jan. 18, 2019, 9 pgs.
International Application No. PCT/US2011/029264, Int'l Preliminary Report on Patentability mailed Oct. 4, 2012, 5 pgs.
International Patent Application No. PCT/US2011/029264, International Search Report and Written Opinion dated May 17, 2011, 8 pgs.
United Kingdom Application No. 1218207.7, Office Action mailed Mar. 24, 2014, 1 pg.
United Kingdom Application No. 1218207.7, Office Action mailed Apr. 24, 2013, 3 pgs.
United Kingdom Application No. 1218207.7, Office Action mailed Jul. 25, 2014, 1 pg.
United Kingdom Application No. 1218207.7, Office Action mailed Aug. 7, 2013, 2 pgs.
United Kingdom Application No. 1218207.7, Office Action mailed Sep. 4, 2014, 2 pgs.

* cited by examiner

TILE BASED MEDIA CONTENT SELECTION

CROSS-REFERENCE TO RELATED APPLICATION(S)

This application is a continuation of U.S. patent application Ser. No. 17/697,713, filed Mar. 17, 2022, which is a continuation of U.S. patent application Ser. No. 16/382,014, filed Apr. 11, 2019, now U.S. Pat. No. 11,307,736, which is a continuation of U.S. patent application Ser. No. 14/522,106, filed Oct. 23, 2014, now U.S. Pat. No. 10,261,657, which is a continuation of U.S. patent application Ser. No. 13/053,093, filed Mar. 21, 2011, now U.S. Pat. No. 8,887,202, which claims priority to Provisional Application No. 61/316,156, filed Mar. 22, 2010, the disclosures of which are incorporated by reference in their entireties.

DESCRIPTION OF RELATED ART

The present disclosure relates to media content management, such as video content selection, manipulation, and playback using tile based mechanisms.

Conventional list based electronic program guides provide users with information to allow video content selection. Some electronic program guides provide hundreds or thousands of options including numerous channels and video on demand clips. However, mechanisms for sorting through the options and selecting video content are limited. Consequently, the techniques and mechanisms of the present invention provide improved mechanisms to efficiently managing media content using tile based mechanisms.

OVERVIEW

Mechanisms are provided for allowing a user to dynamically manage rich media content in an efficient and effective manner Tiles including media content, personalized video selections, content pack upgrades, and promotions for featured content are presented to a user. Each tile may include calls to view, purchase, discuss, rate, review, or read about associated content. Tiles may be presented as still images, logos, text, or live video. Multiple tiles may be manipulated using keyboard, mouse, touchpad, and/or touchscreen movements, motions, and gestures. In particular examples, an overlay provided on top of a tile mechanism provides a user with additional navigation and management options.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
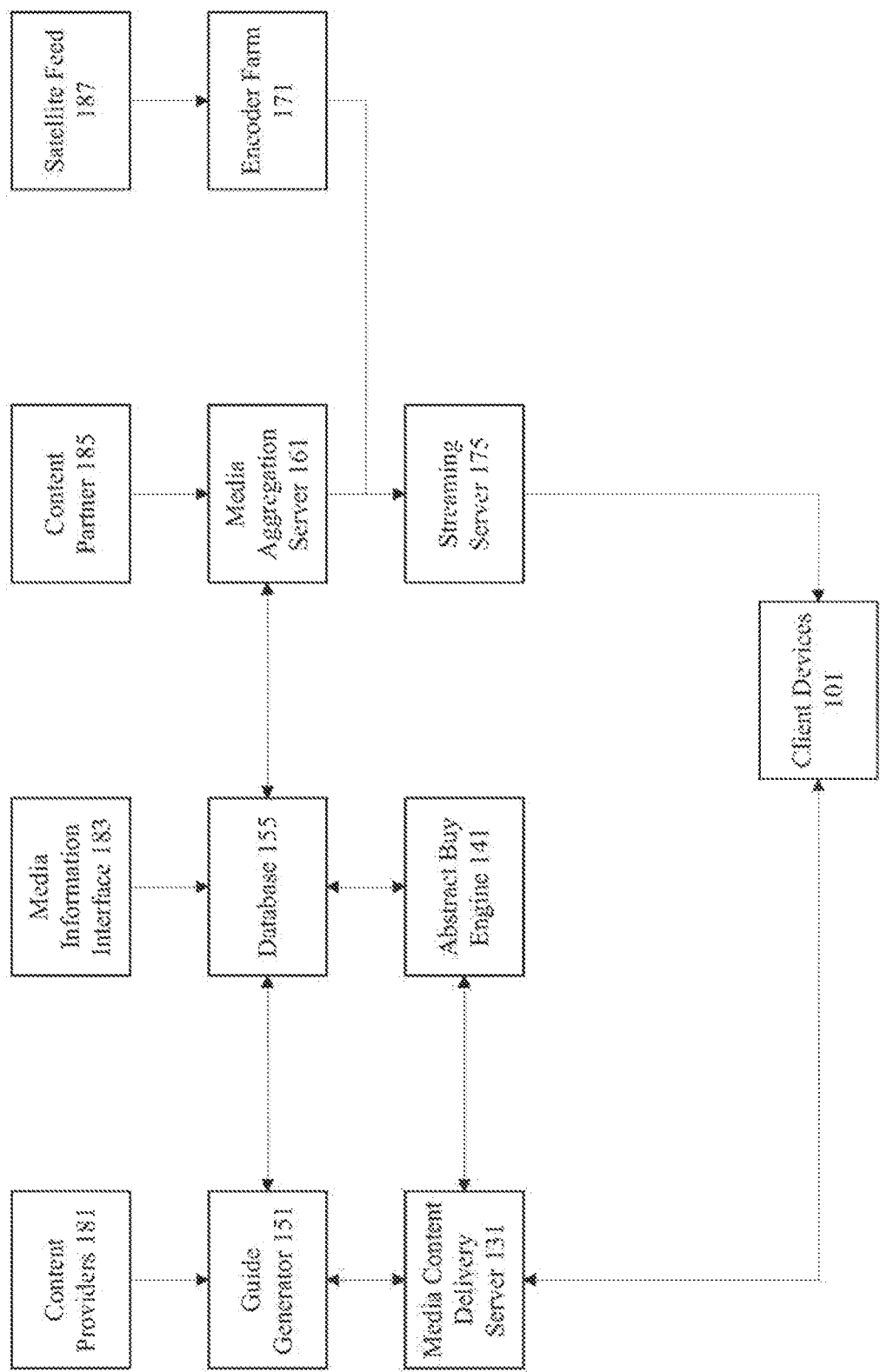
FIG. 1 illustrates a particular example of a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular devices such as mobile devices. However, it should be noted that the techniques and mechanisms of the present invention can be used with a variety of devices including general computing devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Selecting video content on a device such as a mobile phone or a portable computing device can often be inefficient. In many instances, subscription packages provide hundreds of channels and thousands of video on demand clips. It is difficult for a user to identify interesting or exciting content. In some instances, electronic program guides can organize content by category, such as dramas, sports, or movies and provide the content in numerically ordered channel listings. In some other instances, popular programs or award winning content is flagged for a user. Electronic program guides may also be filtered. In some examples, non-family oriented programming is filtered based on user selection.

However, providing thousands of channels and video clips to a user results in a large of amount of information and choices. This information may be shown in a part of a display or condensed onto a device screen. The information may scroll automatically or may scroll after user input. In many instances, channels and video clips may be listed in numerical order or alphabetical order. In either case, it takes a tremendous amount of time to sift through content, and even after viewing the entries, a user still may have insufficient information to make an intelligent selection.

Consequently, the techniques and mechanisms of the present invention present a tile based mechanism for displaying content for user selection and management. A user can efficiently view options. Tiles may be personalized for a particular user based on user preferences, user characteristics, social networking buzz, popularity, ratings, etc. Tiles may correspond not only to particular channels or programs, but may correspond with purchase offers, information, series information, premium subscription offers, etc. Each tile may have multiple selection options including in application purchase, archive program viewing, additional content viewing, etc. Tiles themselves may be still images, icons, logos, or live channel feeds. Using the live channel as a background, a lightweight menu-driven navigation system can be used to position an overlay indicator to select video content. Alternatively, numeric or text based navigation schemes could also be used.

According to particular embodiments, tiles include video content such as live video content, looped clip content, trailers, advertisements, etc. Tiles may also include user selected live channels of both live and on-demand or clip content. The live content and clip streams can be arranged in a variety of visual patterns. In particular examples, tiles are dynamically changing based on popularity and viewership information.

Tiles can be displayed on a user device in an efficient and effective manner According to particular embodiments, a relatively lightweight client side application provides an interface for a user to navigate tiles. In some examples, a tile may allow navigation to numerous other tiles. In particular examples, numeric or text selection mechanisms can be provided to select channel content. For example, particular numeric or text codes can be mapped to particular streams displayed in tiles.

FIG. 1 is a diagrammatic representation showing one example of a network that can use the techniques of the present invention. According to various embodiments, media content is provided from a number of different sources 185. Media content may be provided from film libraries, cable companies, movie and television studios, commercial and business users, etc. and maintained at a media aggregation server 161. Any mechanism for obtaining media content from a large number of sources in order to provide the media content to mobile devices in live broadcast streams is referred to herein as a media content aggregation server. The media content aggregation server 161 may be clusters of servers located in different data centers. According to various embodiments, content provided to a media aggregation server 161 is provided in a variety of different encoding formats with numerous video and audio codecs. Media content may also be provided via satellite feed 187.

An encoder farm 171 is associated with the satellite feed 187 and can also be associated with media aggregation server 161. The encoder farm 171 can be used to process media content from satellite feed 187 as well as possibly from media aggregation server 161 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi-Narrow Band (AMR-NB), Advanced Audio coding (AAC), and AACPlus. The media content may also be encoded to support a variety of data rates. The media content from media aggregation server 161 and encoder farm 171 is provided as live media to a streaming server 175. In one example, the streaming server is a Real Time Streaming Protocol (RTSP) server 175. Media streams are broadcast live from an RTSP server 175 to individual client devices 101. A variety of protocols can be used to send data to client devices.

Possible client devices 101 include personal digital assistants (PDAs), cellular phones, personal computing devices, personal computers etc. According to various embodiments, the client devices are connected to a cellular network run by a cellular service provider. In other examples, the client devices are connected to an Internet Protocol (IP) network. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 131. The media content delivery server 131 is configured to allow a client device 101 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 151. The guide generator 151 obtains information from disparate sources including content providers 181 and media information sources 183. The guide generator 151 provides program guides to database 155 as well as to media content delivery server 131 to provide to client devices 101.

According to various embodiments, the guide generator 151 obtains viewership information from individual client devices. In particular embodiments, the guide generation 151 compiles viewership information in real-time in order to generate a most-watched program content. The client device 101 can request program guide information and the most-watched program guide content can be provided to the client device 101 to allow efficient selection of video content. According to various embodiments, guide generator 151 is connected to a media content delivery server 131 that is also associated with an abstract buy engine 141. The abstract buy engine 141 maintains subscription information associated with various client devices 101. For example, the abstract buy engine 141 tracks purchases of premium packages.

The media content delivery server 131 and the client devices 101 communicate using requests and responses. For example, the client device 101 can send a request to media content delivery server 131 for a subscription to premium content. According to various embodiments, the abstract buy engine 141 tracks the subscription request and the media content delivery server 131 provides a key to the client device 101 to allow it to decode live streamed media content. Similarly, the client device 101 can send a request to a media content delivery server 131 for a most-watched program guide for its particular program package. The media content delivery server 131 obtains the guide data from the guide generator 151 and associated database 155 and provides appropriate guide information to the client device 101.

Although the various devices such as the guide generator 151, database 155, media aggregation server 161, etc. are shown as separate entities, it should be appreciated that various devices may be incorporated onto a single server. Alternatively, each device may be embodied in multiple servers or clusters of servers. According to various embodiments, the guide generator 151, database 155, media aggregation server 161, encoder farm 171, media content delivery server 131, abstract buy engine 141, and streaming server 175 are included in an entity referred to herein as a media content delivery system.

Figure 2:
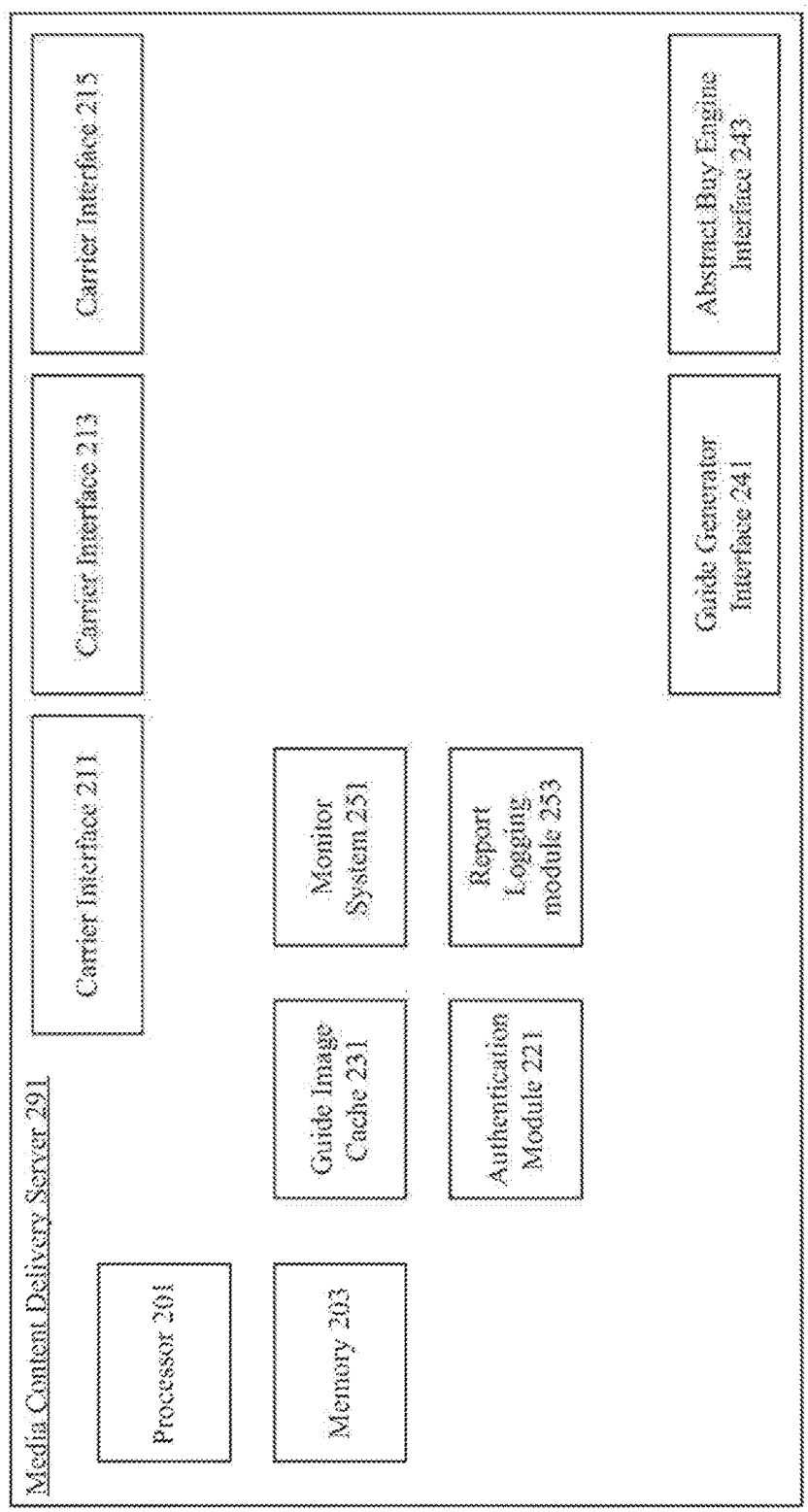
FIG. 2 illustrates a particular example of a content delivery system.

FIG. 2 is a diagrammatic representation showing one example of a media content delivery server 291. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. The media content delivery server 291 can also maintain static information such as icons and menu pages. The interfaces also include a carrier interface 211 allowing operation with mobile devices such as cellular phones operating in a particular cellular network. The carrier interface allows a carrier vending system to update subscriptions. Carrier interfaces 213 and 215 allow operation with mobile devices operating in other wireless networks. An abstract buy engine interface 243 allows communication with an abstract buy engine that maintains subscription information.

An authentication module 221 verifies the identity of mobile devices. A logging and report generation module 253 tracks mobile device requests and associated responses. A monitor system 251 allows an administrator to view usage patterns and system availability. According to various embodiments, the media content delivery server 291 handles requests and responses for media content related transactions while a separate streaming server provides the actual media streams. In some instances, a media content delivery server 291 may also have access to a streaming server or operates as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

Figure 3:
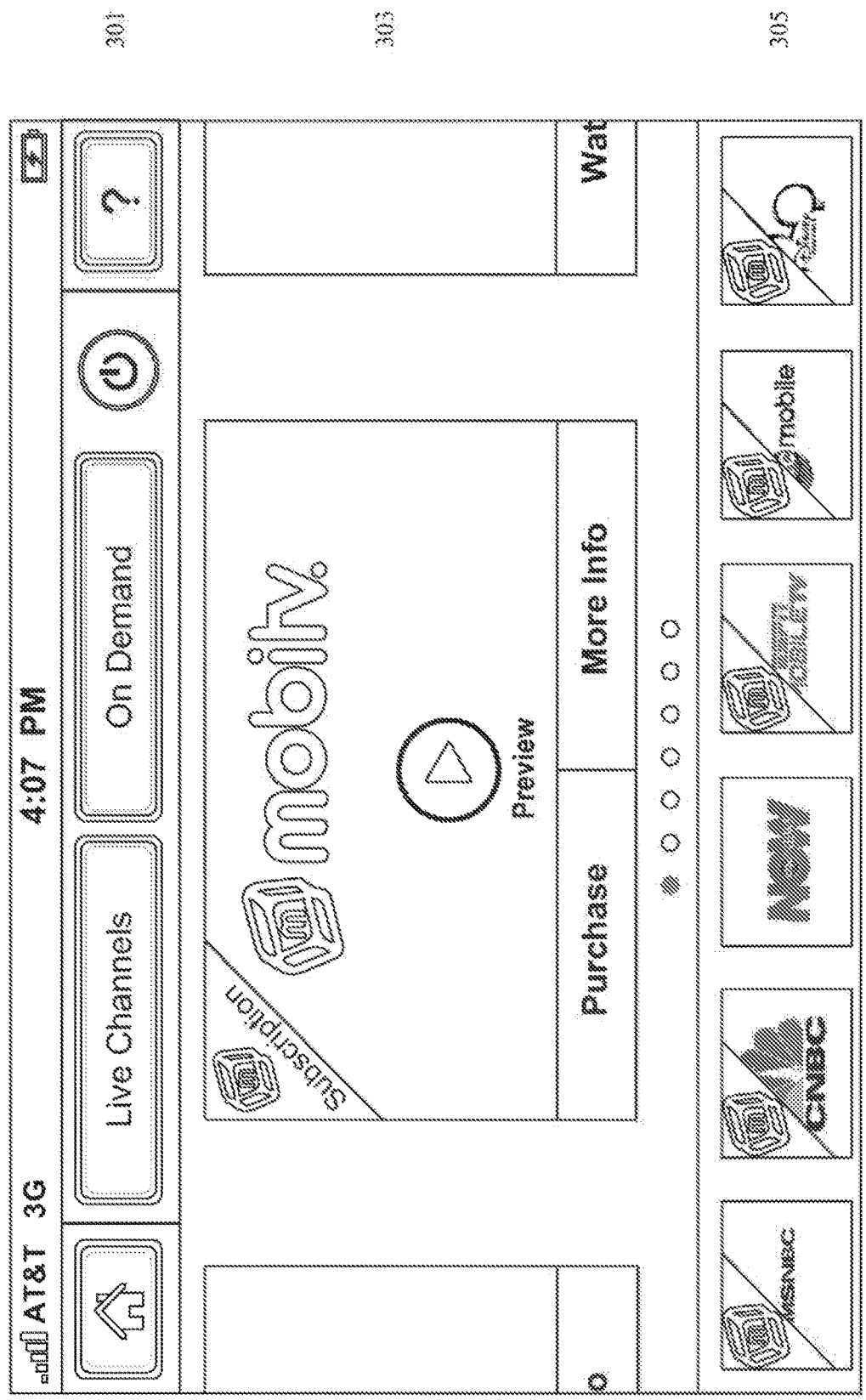
FIG. 3 illustrates a particular example of a tile based media content delivery mechanism.

FIG. 3 illustrates a particular example of a tile based media content delivery system. According to particular embodiments, a display is configured to show multiple tiles. According to various embodiments, the tile based delivery system includes a navigation bar with home, live channels, on demand, power, and help buttons at 301. Multiple tiles are shown in row 303. According to various embodiments, each tile may correspond to a particular program, channel, purchase offer, event, etc. In particular embodiments, each tile includes multiple options to purchase, select, view, download, review, rate, or discuss the content. In some examples, the tiles are scrollable using a side swipe gesture, keypad controls, numeric or text entry, etc. The tiles may be selected for each particular user based on user characteristics, user preferences, viewing history, purchase history, interests, real-time popularity, social network buzz, social network recommendations, etc. In other examples, tile placement is bid upon and/or purchased by content providers and advertisers, to allow presentation of selected content to viewers. In still other examples, content providers and advertisers can bid to place tiles in preferred positions for particular demographic groups or subscriber groups.

According to various embodiments, channel and network logos are presented at 305. Channel and network logos may similarly be scrollable and presented based on viewing history, user preferences, real-time popularity, social network buzz, etc.

Each channel may show live or prerecorded content. In some examples channel and network logos are still images or logos. In other examples, the channel and network logos are live video streams. According to particular embodiments, the live video streams shown in portion 305 are not generated by an end device receiving multiple video streams and aggregating the streams onto a single display section. Although this may be possible, this would consume a large amount of bandwidth and processing resources. Some devices do not have the ability to render multiple video feeds. According to particular embodiments, the video stream is generated by a server associated with a content or service provider. The content or service provider provides multiple video streams to an end user by aggregating them into a single stream for display in section 305.

Selecting or clicking on various tiles will show content or options including in application purchase options, upgrade options, subscription options, content selection options, content review or discussion options, etc. In some examples, clicking on a tile will display all episodes available for a particular program. It should be noted that a variety of tile and menu arrangements are possible. The navigation control can also slide off the screen when media content is being viewed.

Figure 4:
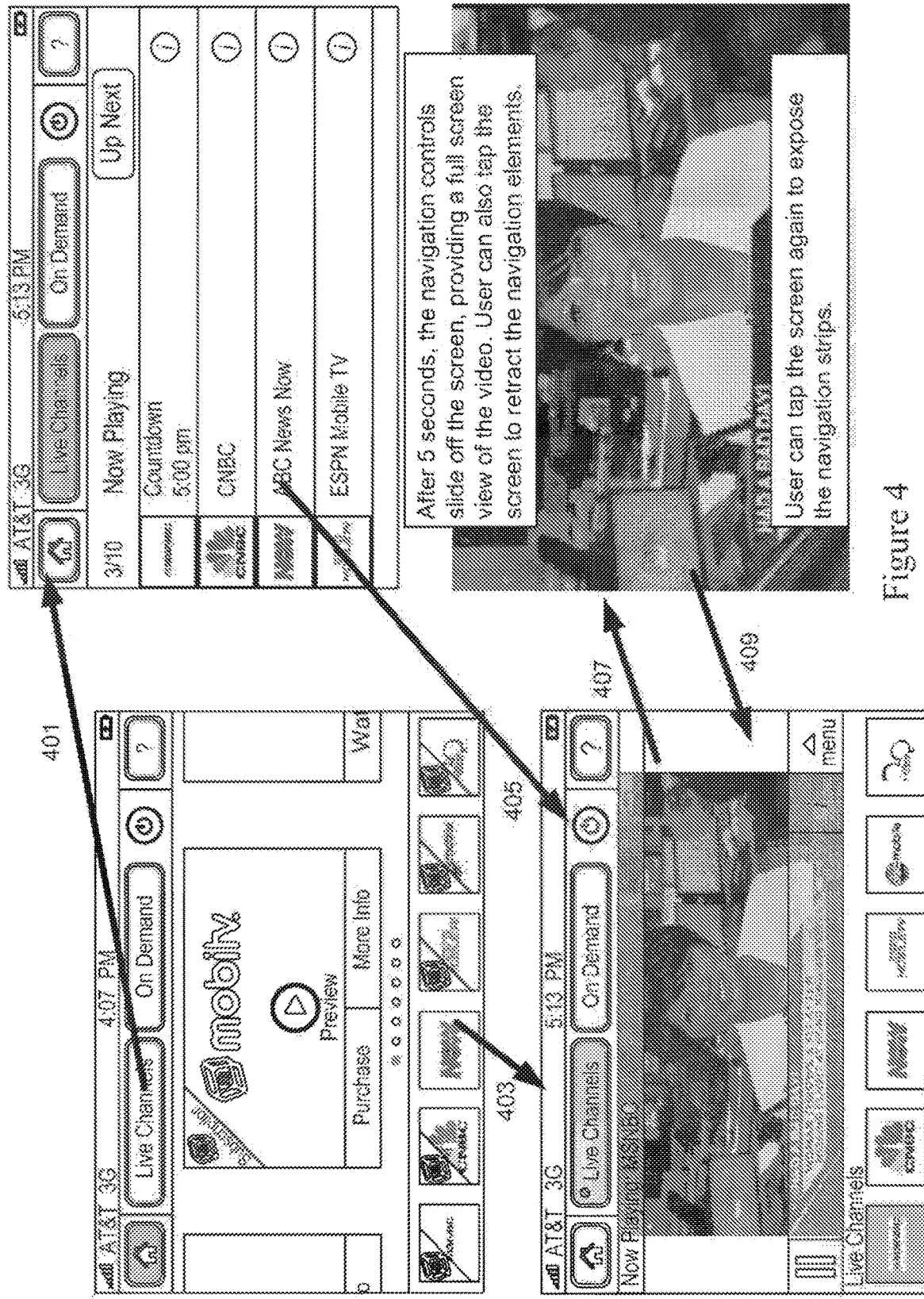
FIGS. 4 and 5 illustrate examples of live channel navigation.

FIG. 4 illustrates an example of live channel viewing. A live channel can be selected using multiple mechanisms, including selecting a logo or generating a list or searchable list of channels. Selecting live channels at 401 provides a listing of channels currently available. Selecting on a particular channel at 403 or 405 displays what is currently being played on the particular channel. In some examples, clicking on the content being played shows a full screen view of the content at 407. In other examples, navigation controls slide off the screen automatically after a predetermined period of time, such as 5 seconds. A user can tap the screen again at 409 to expose the navigation strips.

Figure 5:
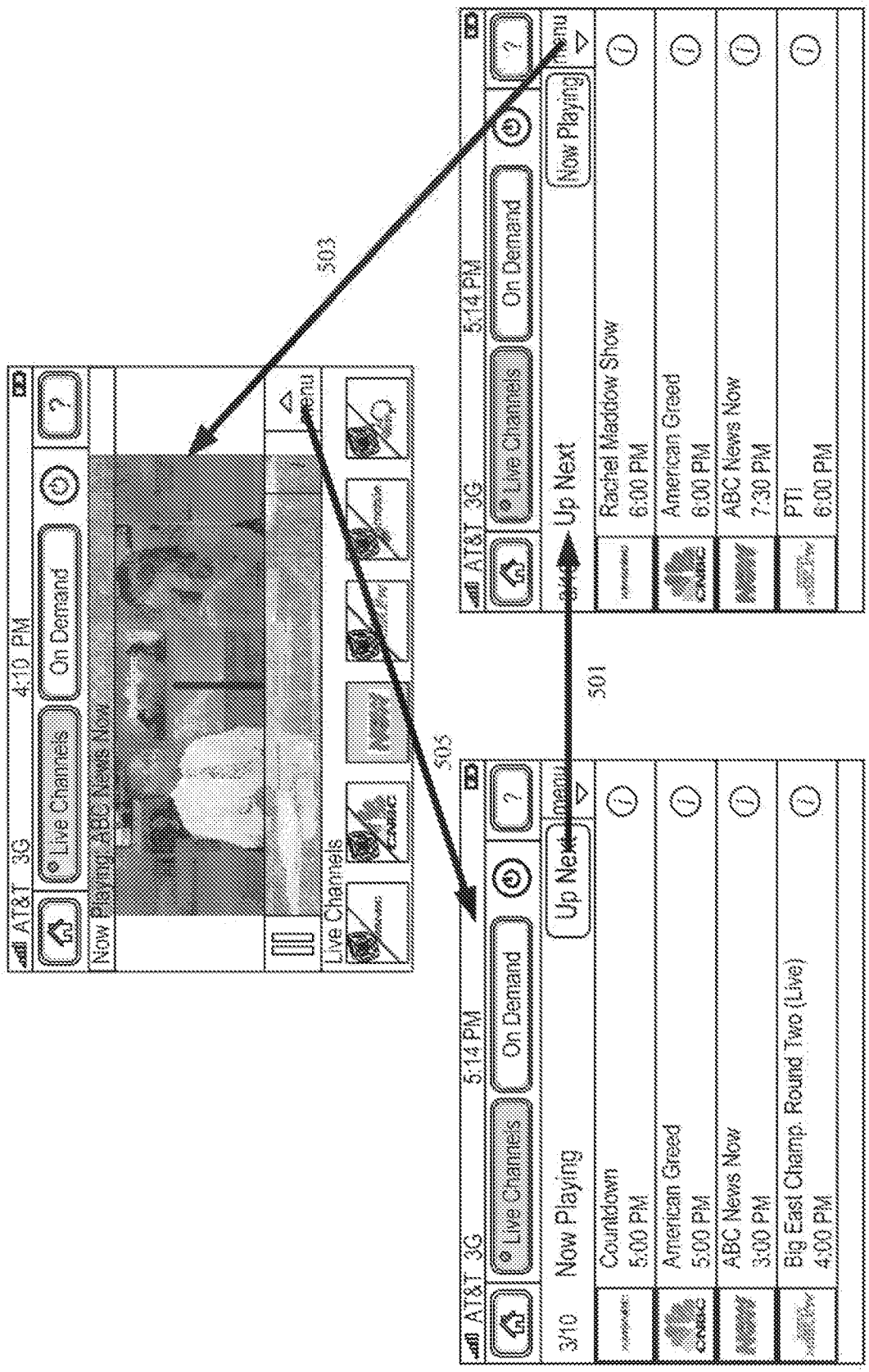

FIG. 5 illustrates a mechanism for browsing live channels. According to various embodiments, a user can elect to see upcoming programming at 501 as well as opt to see a preview at 503 or hide a preview at 505.

Figure 6:
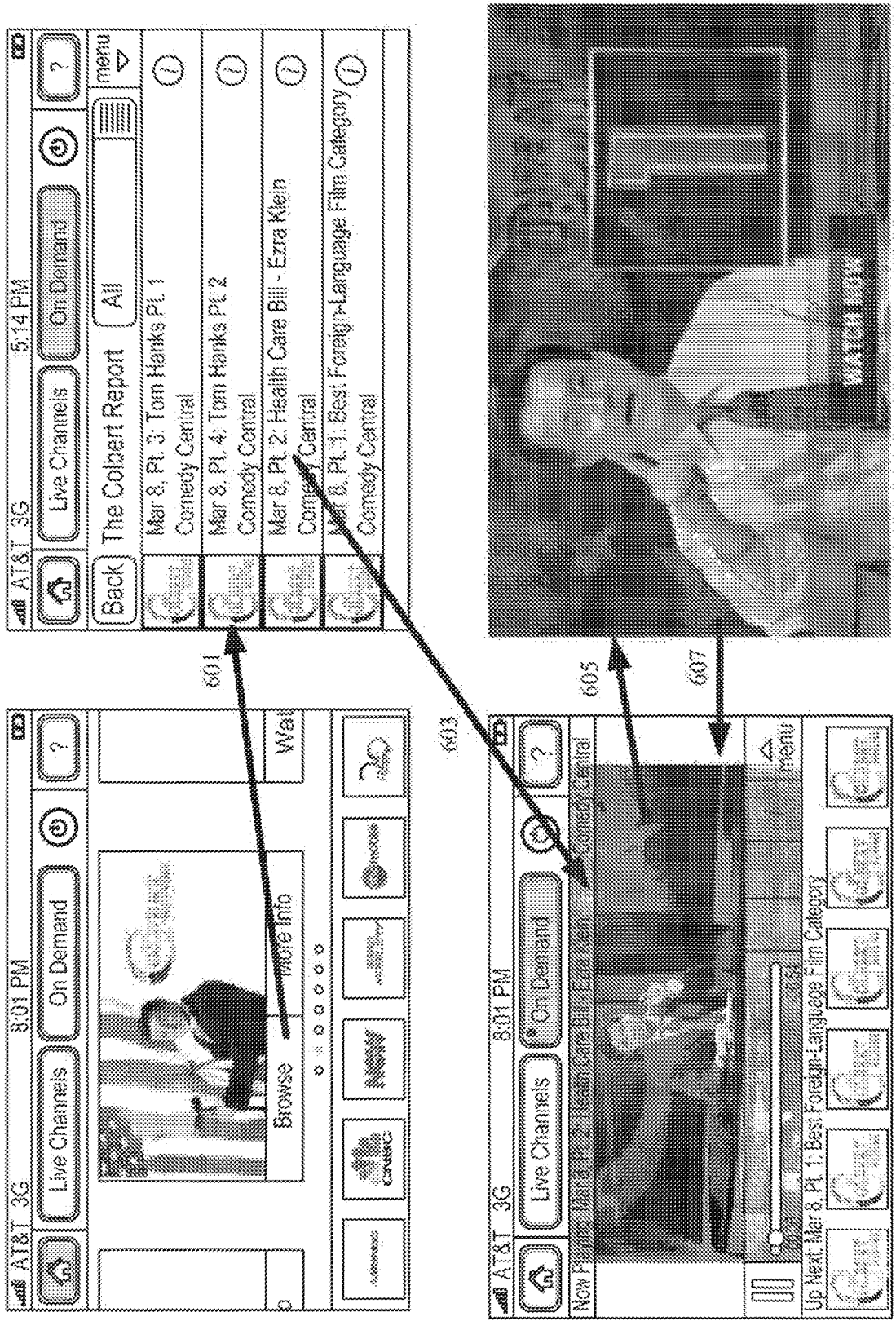
FIGS. 6 and 7 illustrate examples of on-demand or clip navigation.

FIG. 6 illustrates a mechanism for browsing on demand content from a tile. A user can select a tile identifying a program at 601 to display different portions of the program or different episodes of the program. In particular embodiments, selecting a portion, segment, or episode at 603 begins playback of the episode. The episode can also be expanded or contracted at 605 and 607.

Figure 7:
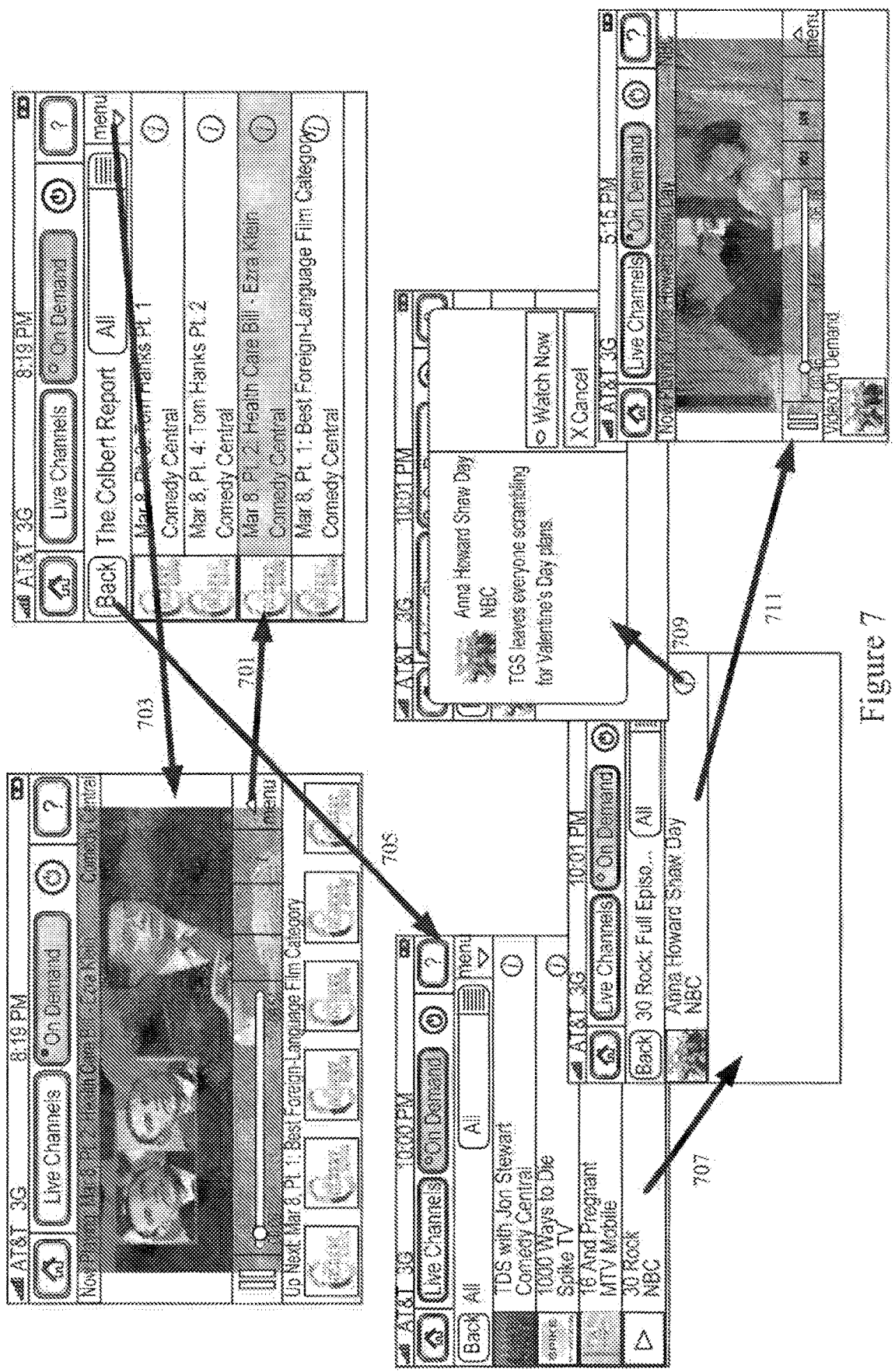

FIG. 7 illustrates a mechanism for browsing on demand content from a menu. A user can elect to show a menu view at 701 or a playback view at 703. The user can also select to show different pieces of program count at 705, a portion or episode listing at 707, or portion or episode information at 709. The user can also elect to play an episode at 711.

Figure 8:
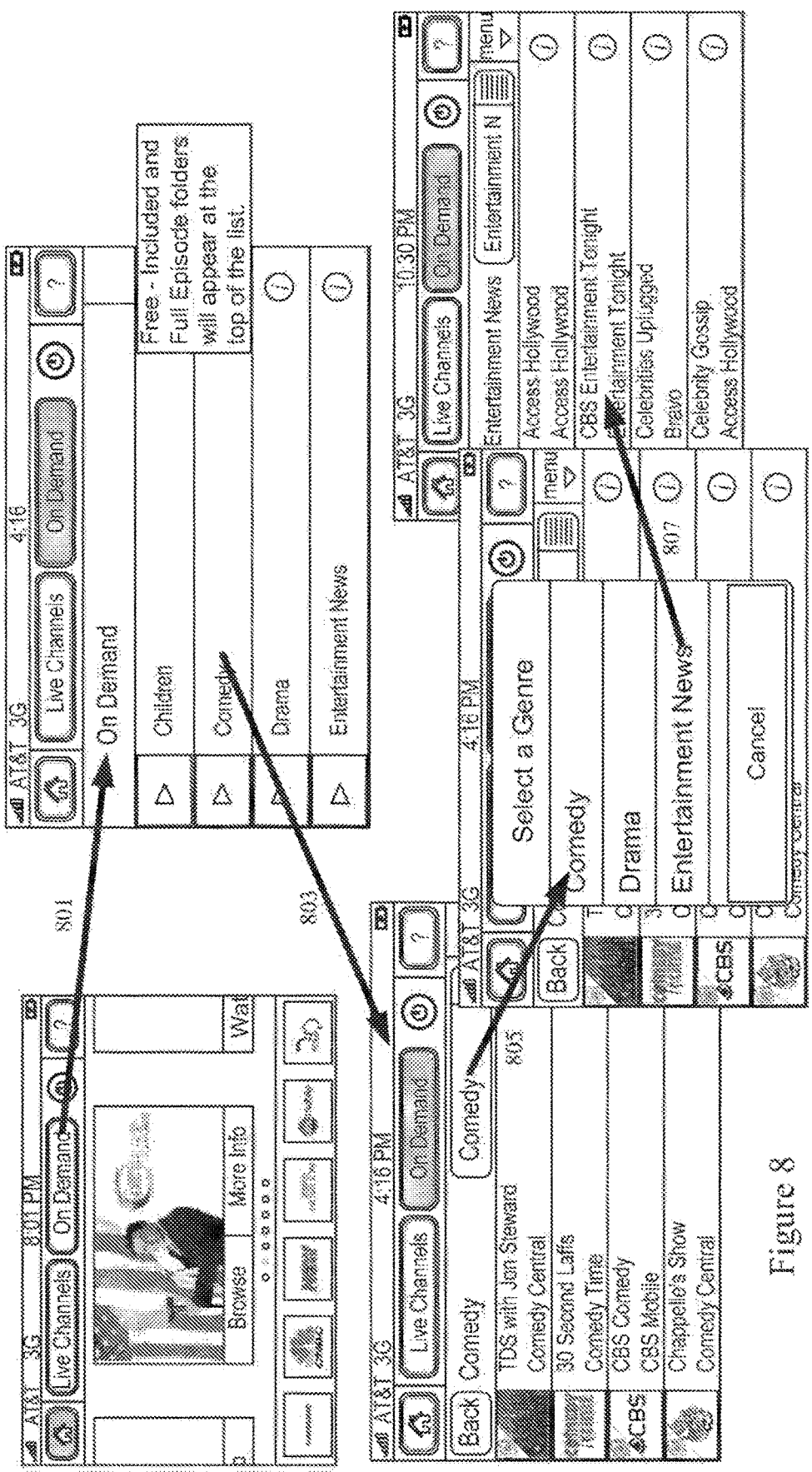
FIGS. 8 and 9 illustrate examples of overlays.

FIG. 8 illustrates a mechanism for browsing on demand genres. A user can select on demand content at 801 and select a particular on demand genre at 803 and 805. The on demand genre presents a listing of on demand content at 807.

Figure 9:
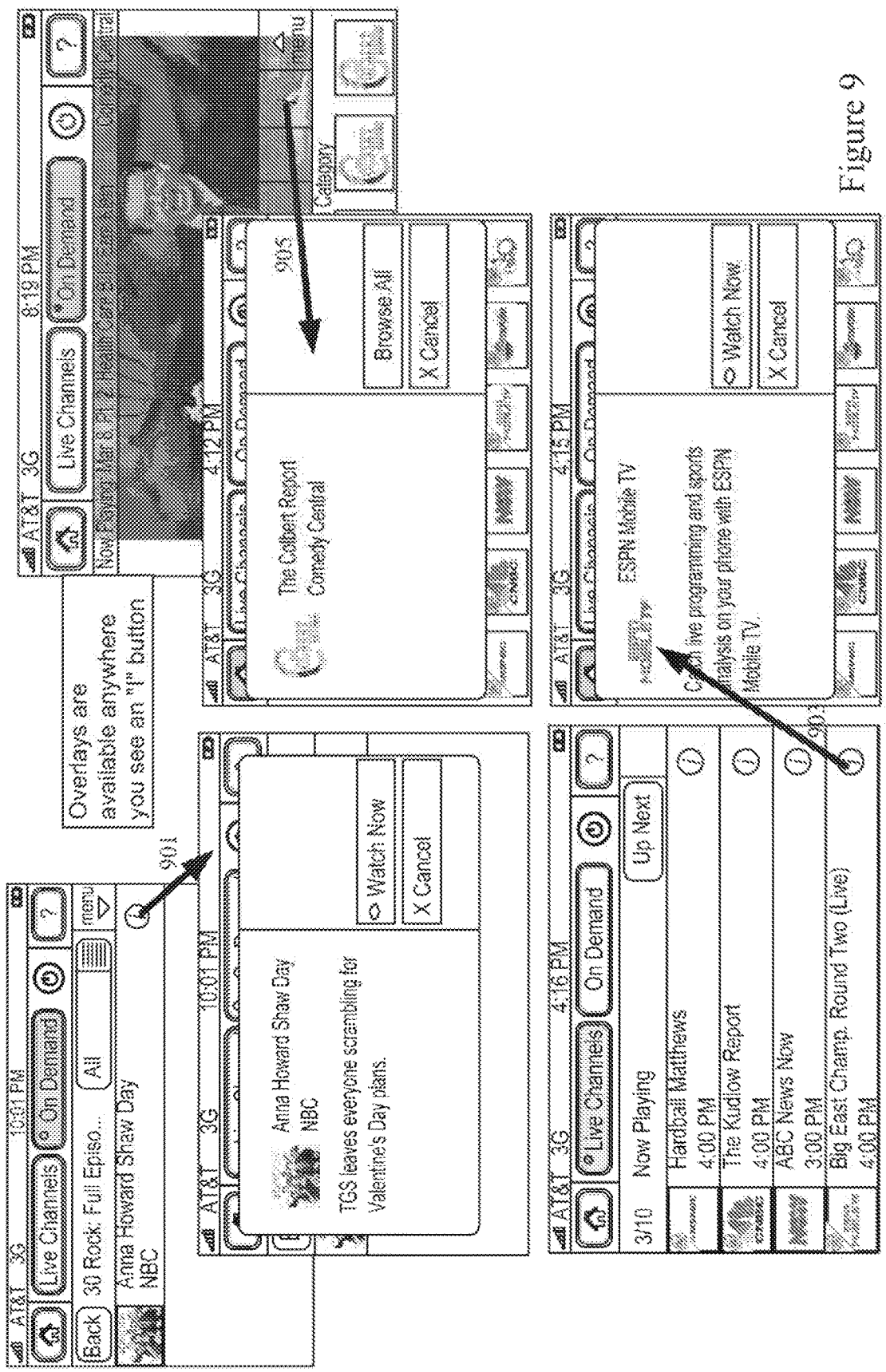

FIG. 9 illustrates interactive overlays. A user can select an overlay to display more information about a particular episode at 901, a particular program at 905, or a particular channel at 903. According to particular embodiments, a client side application provides overlays corresponding to particular tile mechanisms. Overlays may be partially or completely transparent, allowing a user to interact with a tile view. Overlays may be generated or predefined. In particular examples, a device receives mapping information from a provider and shows a display with overlay selection boxes. According to particular embodiments, a user navigates the overlay selection boxes and selects options by identifying a particular overlay selection such as overlay selection. The overlay selection boxes may be arranged in a variety of visual patterns. In particular examples, an overlay highlights a particular video channel when selected. Selecting the channel in overlay selection results in a channel change to allow viewing of the corresponding video content. According to particular embodiments, the overlay has the ability to support customized advertising on channels.

Figure 10:
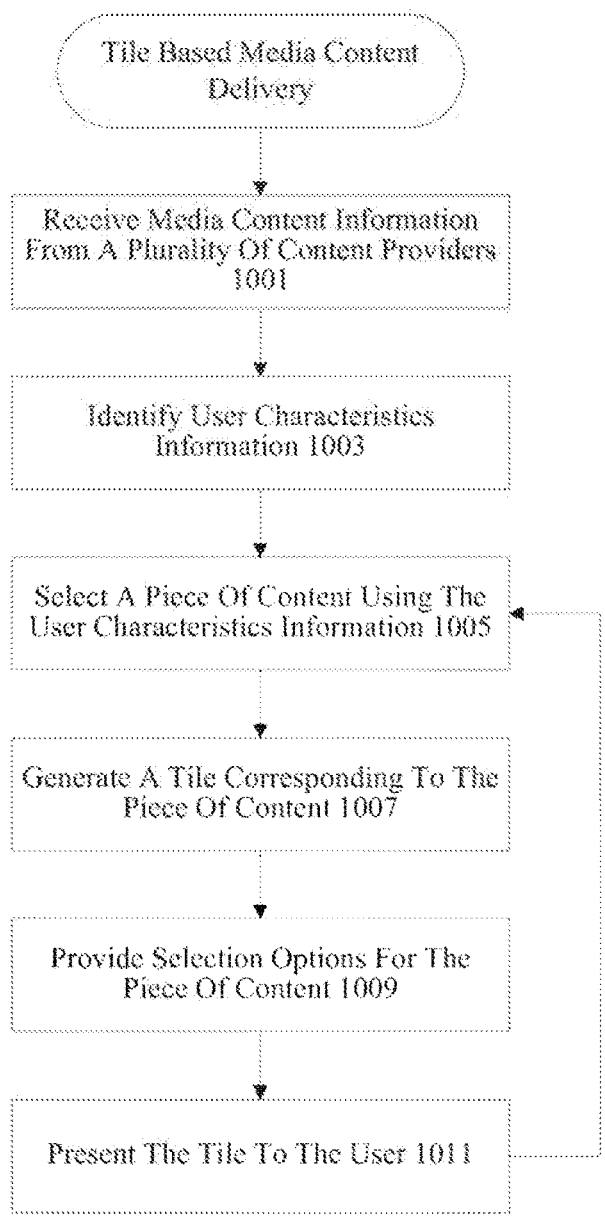
FIG. 10 illustrates a technique for tile based media content delivery.

FIG. 10 illustrates one example of a technique for present tile based media. At 1001, a server and/or device receives media content information from multiple content providers. The media content information may identify movies, live programming, television shows, advertisements, clips, videos, audio, etc. The media content information may also include information about the media content, live discussion about the media content, associated social networking feeds, comments, ratings, etc. At 1003, user characteristics information is identified. User characteristics may include demographic information, viewing history, preferences, interests, device capabilities, etc. According to various embodiments, a piece of content is selected using the user characteristics information at 1005. The piece of content may correspond to an estimation of what the user would be interested in viewing at a particular time.

In some examples, content providers may provide incentives to a server entity, device, or application provider to place particular content in highlighted areas. For example, a content provider may incentivize placement of a pay per view sports program as a first tile that a user would view upon launching an application. The content delivery provider, application provider, or device provider would receive a particular sum in return for presentation of that particular first tile. According to various embodiments, a tile corresponding to a piece of content is generated at 1007. The tile may include images, video, text, data, etc. At 1009, selections options for navigating to the piece of content itself, viewing information about the content, discussing the content, reviewing the content, finding associated content, viewing episode information, etc. is provided. At 1011, the tile is presented to the user. According to various embodiments, multiple tiles are generated and presented to the user simultaneously.

Figure 11:
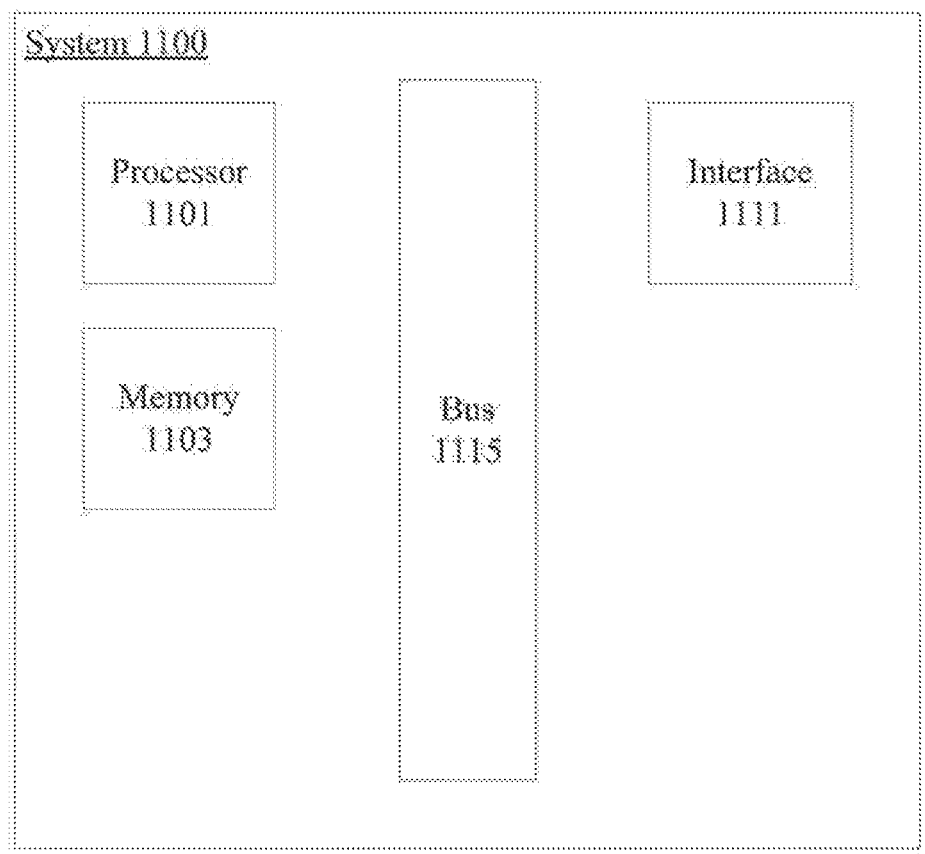
FIG. 11 illustrates an example of a computer system that can be used to implement various embodiments.

For example, a FIG. 11 provides one example of a system that can be used to implement one or more mechanisms. According to particular example embodiments, a system 1100 suitable for implementing particular embodiments of the present invention includes a processor 1101, a memory 1103, an interface 1111, and a bus 1115 (e.g., a PCI bus). When acting under the control of appropriate software or firmware, the processor 1101 is responsible for such tasks such as pattern generation. Various specially configured devices can also be used in place of a processor 1101 or in addition to processor 1101. The complete implementation can also be done in custom hardware. The interface 1111 is typically configured to send and receive data packets or data segments over a network. Particular examples of interfaces the device supports include host bus adapter (HBA) interfaces, Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as data synthesis.

According to particular example embodiments, the system 1100 uses memory 1103 to store data, algorithms and program instructions. The program instructions may control the operation of an operating system and/or one or more applications, for example. The memory or memories may also be configured to store received data and process received data.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. Computer readable storage media refer to physical and tangible media such as disks, solid state memory, and persistent storage and excludes carrier waves.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

The invention claimed is:

1. A method comprising:
    maintaining a database comprising a plurality of user profiles;
    receiving, from a first device, a request to provide a tile-based interface, wherein the first device is associated with a first user profile of the plurality of user profiles;
    based at least in part on the request, selecting a plurality of media content items from a database of content items to be displayed as recommended items in the tile-based interface;
    for one or more respective media content items of the plurality of media content items that were selected to be displayed as recommended items in the tile-based interface:
        accessing, from the database, first user profile data of the first user profile;
        generating a respective user interface tile, wherein an appearance of the respective user interface tile is personalized based on the first user profile data accessed from the database, and wherein the appearance of the respective user interface tile comprises:
            (a) a personalized image representative of the respective media content item, wherein the personalized image is selected based on the first user profile data accessed from the database; and
            (b) a consumption option for consuming the respective media content item; and
        providing for display one or more respective user interface tiles generated for the plurality of media content items.

2. The method of claim 1, wherein providing for display one or more respective user interface tile comprises:
    generating for display each of the one or more respective user interface tiles.

3. The method of claim 1, wherein selecting the personalized image based on the first user profile data comprises:
    matching a first metadata associated with the first user profile data to a second metadata associated with the personalized image.

4. The method of claim 1, wherein the providing for display the one or more respective user interface tiles comprises:
    selecting a position for each of the one or more respective user interface tiles based on data provided by a content provider.

5. The method of claim 1, further comprising:
    receiving a user interface selection of the user interface tile corresponding to the media content item; and
    in response to the receiving, playing of at least one portion of the media content item.

6. The method of claim 1, further comprising:
    identifying a plurality of second media content items for recommendation;
    for one or more respective second media content items of the plurality of second media content items:
        generating a second respective user interface tile comprising:
            (a) a respective fixed image representative of the respective second media content item, and
            (b) a consumption option for consuming the respective second media content item; and
        providing for display one or more respective user interface tiles generated for the plurality of second media content items.

7. A system comprising:
    control circuitry configured to:
        maintain a database comprising a plurality of user profiles;
        receive, from a first device, a request to provide a tile-based interface, wherein the first device is associated with a first user profile of the plurality of user profiles; and
        based at least in part on the request, select a plurality of media content items from a database of content items to be displayed as recommended items in the tile-based interface; and
    input/output circuitry configured to, for one or more respective media content items of the plurality of media content items that were selected to be displayed as recommended items in the tile-based interface:
        access, from the database, first user profile data of the first user profile;
        generate a respective user interface tile, wherein an appearance of the respective user interface tile is personalized based on the first user profile data accessed from the database, and wherein the appearance of the respective user interface tile comprises:
            (a) a personalized image representative of the respective media content item, wherein the personalized image is selected based on the first user profile data accessed from the database; and
            (b) a consumption option for consuming the respective media content item; and
        provide for display one or more respective user interface tiles generated for the plurality of media content items.

8. The system of claim 7, wherein the input/output circuitry is configured to provide for display one or more respective user interface tiles by:
    generating for display each of the one or more respective user interface tiles.

9. The system of claim 7, wherein the control circuitry is configured to select the personalized image based on the first user profile data by:
    matching a first metadata associated with the first user profile data to a second metadata associated with the personalized image.

10. The system of claim 7, wherein the input/output circuitry is configured to provide for display the one or more respective user interface tiles by:
    selecting a position for each of the one or more respective user interface tiles based on data provided by a content provider.

11. The system of claim 7, wherein the input/output circuitry is further configured to:
    receive a user interface selection of the user interface tiles corresponding to the media content item; and
    in response to the receiving, play at least one portion of the media content item.

12. The system of claim 7,
    wherein the control circuitry is further configured to:
        identify a plurality of second media content items for recommendation; and
    wherein the input/output circuitry is further configured to, for one or more respective second media content items of the plurality of second media content items:
        generate a second respective user interface tile comprising:

(a) a respective fixed image representative of the respective second media content item, and
(b) a consumption option for consuming the respective second media content item; and
provide for display one or more respective user interface tiles generated for the plurality of second media content items.

13. A non-transitory computer readable medium comprising:
instructions that when executed by control circuitry cause the control circuitry to:
maintain a database comprising a plurality of user profiles;
receive, from a first device, a request to provide a tile-based interface, wherein the first device is associated with a first user profile of the plurality of user profiles; and
based at least in part on the request, select a plurality of media content items from a database of content items based on a user profile data to be displayed as recommended items in a tile-based interface; and
instructions that when executed by input/output circuitry cause the input/output circuitry to, for one or more respective media content item of the plurality of media content items that were selected to be displayed as recommended items in the tile-based interface:
access, from the database, first user profile data of the first user profile;
generate a respective user interface tile, wherein an appearance of the respective user interface tile is personalized based on the first user profile data accessed from the database, and wherein the appearance of the respective user interface tile comprises:
(a) a personalized image representative of the respective media content item, wherein the personalized image is selected based on the first user profile data accessed from the database; and
(b) a consumption option for consuming the respective media content item; and
provide for display each of the one or more user interface tiles generated for the plurality of media content items.

14. The non-transitory computer readable medium of claim 13, wherein the instructions that cause the input/output circuitry to provide for display one or more respective user interface tiles comprise instructions that cause the input/output circuitry to:
generate for display each of the one or more respective user interface tiles.

15. The non-transitory computer readable medium of claim 13, wherein the instructions that cause the control circuitry to select the personalized image based on the first user profile data comprise instructions that cause the control circuitry to:
match a first metadata associated with the first user profile data to a second metadata associated with the personalized image.

16. The non-transitory computer readable medium of claim 13, wherein the instructions that cause the input/output circuitry to provide for display the one or more respective user interface tiles comprise instructions that cause the input/output circuitry to:
select a position for each of the one or more respective user interface tiles based on data provided by a content provider.

17. The non-transitory computer readable medium of claim 13, further comprising instructions that when executed by the control circuitry cause the input/output circuitry to:
receive a user interface selection of the user interface tiles corresponding to the media content item; and
in response to the receiving, play at least one portion of the media content item.

* * * * *